United States Patent [19]
Crameri et al.

[11] Patent Number: 6,166,836
[45] Date of Patent: Dec. 26, 2000

[54] POWER SWITCHING OF OPTICAL FIBRE CABLE BRANCHING UNITS

[75] Inventors: Alan Raymond Crameri, Harlow; David Lancelot Walters, Bishop's Stortford, both of United Kingdom

[73] Assignee: Alcatel, Paris, France

[21] Appl. No.: 09/000,451

[22] PCT Filed: Aug. 7, 1996

[86] PCT No.: PCT/GB96/01916

§ 371 Date: Feb. 6, 1998

§ 102(e) Date: Feb. 6, 1998

[87] PCT Pub. No.: WO97/06610

PCT Pub. Date: Feb. 20, 1997

[30] Foreign Application Priority Data

Aug. 7, 1995 [GB] United Kingdom .................... 9516158

[51] Int. Cl.[7] .............................. H04B 10/00; H04B 10/02
[52] U.S. Cl. ........................... 359/110; 359/141; 359/177
[58] Field of Search ....................................... 359/141, 177

[56] References Cited

U.S. PATENT DOCUMENTS 5,214,312  5/1993  Inoue .......................................... 307/43

Primary Examiner—Leslie Pascal
Assistant Examiner—Dalzid Singh
Attorney, Agent, or Firm—Ware, Fressola, Van der Sluys & Adolphson LLP

[57] ABSTRACT

A branching unit for an optical fibre cable system of the type which has an electrical power conductor for feeding current to electrical equipment provided along a main cable and a communication system and method of operating such a system is disclosed. The branching unit (10) has first and second connections (12, 14) for coupling two sections of trunk cable (16, 18) and a third connection (24) for an optical fibre spur cable (26). A switch arrangement (RL1, RL2, D9, D10) is provided on the conductor of the spur cable (26) to apply an earth (36) to the conductor of the trunk cable (16, 18). This maintains a current path in one trunk section when a failure or break occurs in the other trunk section.

15 Claims, 5 Drawing Sheets

6,166,836

POWER SWITCHING OF OPTICAL FIBRE CABLE BRANCHING UNITS

TECHNICAL FIELD

This invention relates to improvements in or relating to Power Switching of optical fibre cable branching units to a branching unit having a novel switching arrangement, an optical communication system incorporating the switching arrangement and a method of operating an optical communication system. The invention is particularly advantageous in connection with underwater branching units and systems.

BACKGROUND OF THE INVENTION

Optical fibre communication systems for long haul operation normally employ electrical equipment such as repeater amplifiers and supervisory circuits along their length which require the supply of electrical current to power them. In such systems the optical fibre cable includes one or more electrical conductors for supplying such power. Communications systems of this type can have a main trunk cable which extends between remote transmit/receive stations and one or more similar optical fibre spur cables which are each coupled to the trunk cable by individual branching units. In a simple configuration with a single spur, one system of providing a power feed known to us is completely symmetrical in that the application of power to any two of the three cable ends actuates a switching configuration which selects the cable sections from those two ends as being the main feed path and allows the third section to power through an earth at the branching unit. In the case of underwater systems the earth may be a sea earth. Such a system requires 4 or 5 vacuum relays and several other components.

In British Patent Application number GB 2275 834A there is described a branching unit for use in a submarine telecommunications optical cable system which employs electrical power feeding for repeaters/regenerators, in particular a system employing multiple branching units. The unit terminates three line cables 1,2,3 and a sea earth includes three high voltage relays A, B, C only one of which is energised at a time. When electrical power is supplied between any two line terminations. e.g. 1 and 3, an associated relay coil, eg. C is energised so that its contacts isolate the third line termination. e.g. 2, and connect it to the sea earth termination 4 via contacts of a relay D if the power feed direction is from 1 to 3, or via contacts of a relay E if the power feed direction is from 3 to 1.

In British Patent Application number GB 2252 686A there is described a branching unit for use in a submarine telecommunications cable system which employs electrical power feeding for repeaters/regenerators of an optical fibre cable system, and in particular a system employing multiple branching units. The unit terminates three lines cables (at 1, 2, 3) and a sea earth and includes three high voltage relays, A, A1, B, B1, C, C1, only one of which is energised at a time. When electrical power is supplied between any two lines cables e.g. 1 and 3, an associated relay coil, e.g. C, is energised so that its contacts C1 isolate the terminal and connect it to the sea earth.

In British Patent Application number 0495509A2 there is described a feeding system for supplying a current to repeaters (3) on communication cable including a feed line (4) for conducting a current to the repeaters, comprising: a plurality of branching units ($1_j$, j=1, 2, . . . ) provided on the communications cable; terminal stations ($2_i$, i=1, 2, . . . ) each being connected through at least one of the repeaters to one of the branching units ($1_j$), each of the terminal stations feeding a current through the feed line to the repeaters; each of the plurality of branching units having at least one switching circuit for switching to connect the at least one of the repeaters to the communication cable or to the ground, depending when a predetermined threshold current is exceeded conducting through the feed line in the communication cable; the current thresholds of the switching circuits in the plurality of branching units being different from each other.

A requirement has arisen, mainly in Wavelength division multiplex systems for different and potentially simpler power switching in branching units maintaining current supply to the branching units when there is break in the trunk. This invention has resulted from a consideration of these requirements.

SUMMARY OF THE INVENTION

According to one aspect of the invention there is provided a branching unit for an optical fibre cable system of the type which has an electrical power conductor for feeding current to electrical equipment provided along a main cable trunk, the unit having first and second connections for coupling two sections of trunk cable and a third connection for an optical fibre spur cable, switching means which is responsive to a control voltage provided on the conductor of the spur cable to apply an earth to the conductor of the trunk cable sections thereby to maintain a current path from one trunk section to the branching unit when a failure or break occurs in the other trunk section, characterised in that the switching means is responsive to the control voltage only when there is a current path failure in one section of the trunk.

According to a second aspect of the invention there is provided an optical fibre communication system comprising a main trunk cable having an electrical power conductor for feeding current to electrical equipment along the trunk cable, which trunk cable extends between remote transmission/receive station, at least one branching unit for coupling sections of the trunk cable and for connecting an optical fibre spur cable, having an electrical power conductor, from the trunk to another transmission/receive station, switching means which is responsive to a control voltage provided on the conductor of the spur cable to apply an earth to the conductor of the trunk cable sections thereby to maintain a current path from one trunk section to the branching unit when a failure or break occurs in the other trunk section characterised in the switch means is responsive to the control voltage only when there is a current path failure in one section of the trunk.

According to a third aspect of the invention there is provided a method of operating an optical fibre communication system of the type having an optical fibre cable trunk extending between remote transmit/receive stations and at least one branching unit for coupling sections of the trunk and for coupling an optical fibre spur cable from the trunk to another transmit/receive station, the cable having an electrical conductor for supplying electrical power from the remote transmit/receive stations to electrical equipment along the trunk cable, characterised in that the presence of a supply of current to the branching unit is monitored and that only in the absence of a supply, indicative of a fault or break in the trunk cable, a sea earth is automatically applied to the conductor at the branching unit to restore current supply from the trunk end to the side of the branching unit where no fault or break is present.

BRIEF DESCRIPTION OF THE DRAWINGS

In order that the invention and its various other preferred features may be understood more easily, some embodiments thereof will now be described, by way of example only, with reference to the schematic circuit drawings in which.

BEST MODE FOR CARRYING OUT THE INVENTION

Figure 1:
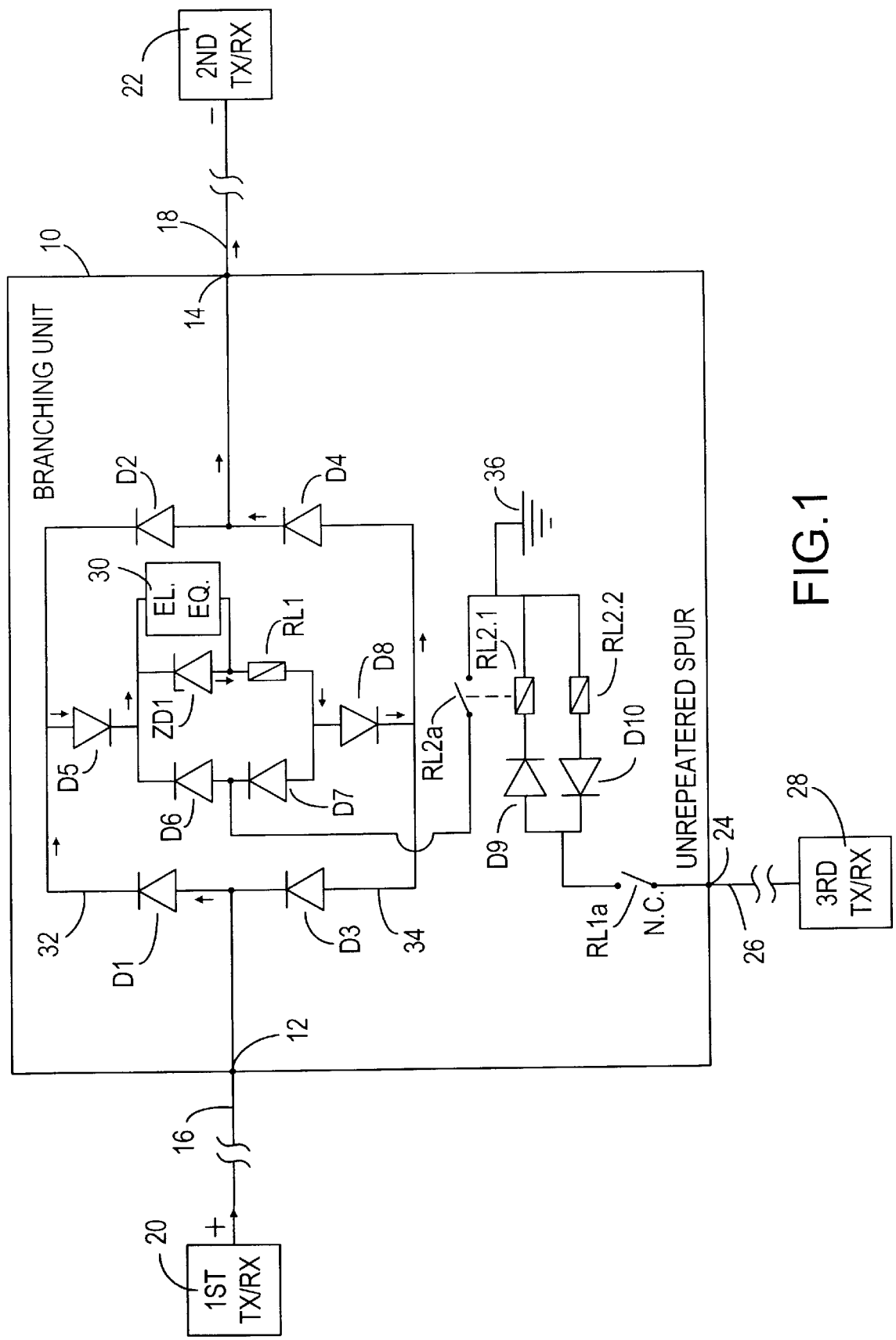
FIG. 1 is a switching circuit employing a latching relay suitable for implementation in a branching unit in accordance with the invention.
Figure 2:
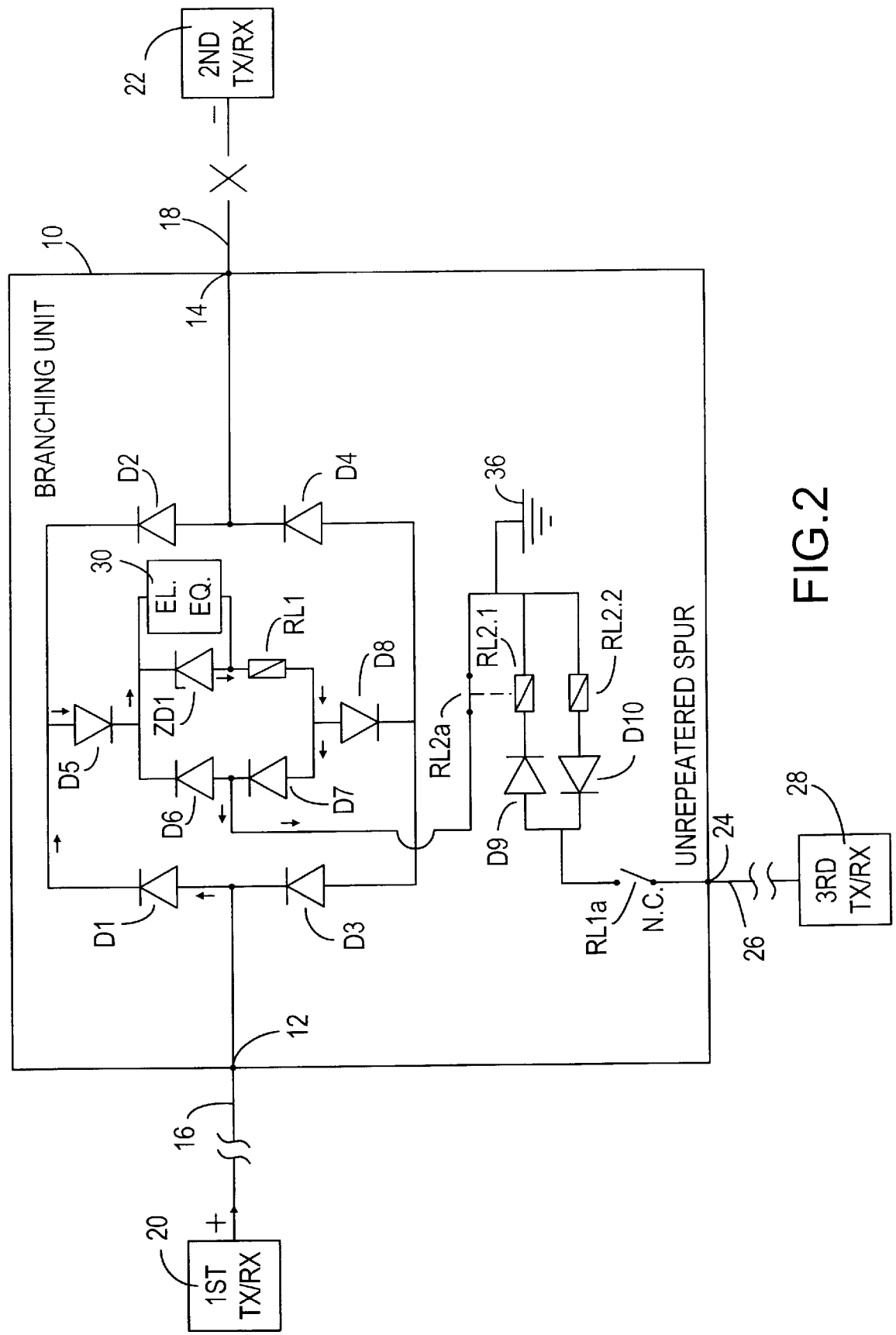
FIG. 2 illustrates the relay contact switching and current paths under fault condition in the trunk in the embodiment of FIG. 1.

In the drawings similar components have been given the same reference numerals to avoid repetitive description.

Referring now to FIG. 1, a branching unit 10 has first and second connections 12 and 14 shown connected to an electrical conductor of first and second sections of optical fibre trunk cable 16, 18 which are coupled to first and second transmitter/receiver stations 20, 22. A third connection 24 is coupled via the electrical conductor of an optical fibre spur cable 26 to a third transmit/receive station 28. A current routing circuit is provided for supplying a voltage with a predetermined polarity orientation to electrical equipment 30 in the branching unit, e.g. repeater amplifier pairs and supervisory equipment, from a supply current supplied between ends of the trunk. The polarity is maintained irrespective of the polarity on the trunk. The current routing circuit comprises a parallel network having a first and second arms 32, 34 each having a pair of diodes D1, D2 and D3, D4 connected in series opposition between the first and second connections 12 and 14. A fifth diode D5 has its anode connected to the junction between the diodes D1 and D2 in the first arm and its cathode connected to the cathode of a sixth diode D6 the anode of which is connected to the cathode of a seventh diode, the anode of which is connected to the anode of an eighth diode D8 whose cathode is connected to the junction between diodes D3 and D4 in the second arm. A series arrangement of a Zener diode ZD1 and a resistor, which in this illustrated embodiment is a relay coil RL1 but may be a simple resistor if a relay is dispensed with. The junction between the diodes D6 and D7 is coupled via the contacts RL2a of a latching relay to an earth 36 which may be a sea earth in the case of submerged equipment.

The third connections 24 of the branching unit is connected via normally open contacts RL1a, or directly if the relay RL1 is dispensed with, to the junction between the anode and cathode respectively of ninth and tenth diodes D9, D10. The cathode of D9 is connected via relay cable RL2.1 of the latching relay which serves to close and latch the contacts RL2a when a positive voltage is applied to connection 24 via the spur cable 26. The anode of the diode D10 is connected via relay coil RL2.2 which is the resetting coil of the relay contacts RL2a and which serves to open the relay contacts when a negative voltage is applied to connection 24 via the spur cable 26.

FIG. 1 shows the normal operation of the circuit in the absence of a trunk fault. The arrows indicate, in terms of conventional current, the direction of current flow when a positive potential is applied from station 20 and a negative potential from station 22. It results in reverse biasing of the Zener diode ZD1 to provide a source of power for the electrical equipment 30 in the branching unit. Current through the relay coil RL1 actuates the relay and opens the contacts RL1a so that there is no current path from the third connection 24 to the relay coils RL2.1, RL2.2 so that the relay RL2 cannot be actuated by voltage control on the connection 24. When there is a fault or break in one of the trunk sections e.g. in the trunk section 18 then the current through the relay coil RL1 drops or fails and the contacts RL1 close. In order to reestablish a flow of current from the trunk section 16 a negative potential is applied by the spur station 28 which actuates and latches the relay RL2 and closes the relay contacts RL2a. The voltage need only be applied momentarily as the relay then remains latched and provides a current path from the relay coil RL1 through D7 to the earth 36 and the power is restored from the first transmit/receive stations 20. The closure of the relay contact RL2a also means that the trunk section 18 is effectively connected to earth via the diode network.

It will be appreciated that the latching relay can only be actuated when there is a failure of the current path along the tracks so that an earth can only be applied when a failure has occurred or at least when no current is flowing along the trunk. The latching relay cannot be released until current flow on the trunk is stopped thereby allowing the relay contacts RL1a to close and complete the circuit between connection 24 and the relay coil RL2.2 which responds to a negative switching voltage.

A similar operation occurs under fault conditions in the first section of trunk cable 16 and is not described in detail. It will be appreciated that a plurality of branching units spaced along a trunk cable may be provided and have similar switching arrangements to maintain operation when a failure of power from one adjacent trunk section occurs.

Some advantages of the current described are:

Secure from unrepeatered terminal whenever the trunk is powered normally.

Unrepeatered spur is safe whenever trunk is powered.

Intervention from spur terminal is required only for fault conditions.

Low component count (2 relays, c.f. 5 relays for symmetrical BU's).

Amplifiers are powered whenever either trunk is powered.

Can carry out power switching in the event of an open circuit fault in the trunk.

Disadvantages:

Safety—'Switched out' trunk leg is isolated—merely reliant on the fact that path to earth is lower resistance through the BU sea earth than through the faulty cable, and so dependent on the diodes in the BU.

Not possible to carry out switching to sea earth if unrepeatered spur is not connected (e.g. if the trunk is laid first, without connecting spurs between the BU's and terminals). This may not be a problem, provided latching relay RL2 is left open after installation.

The insulation resistance of unrepeatered cable may not be always ideal.

Figure 3:
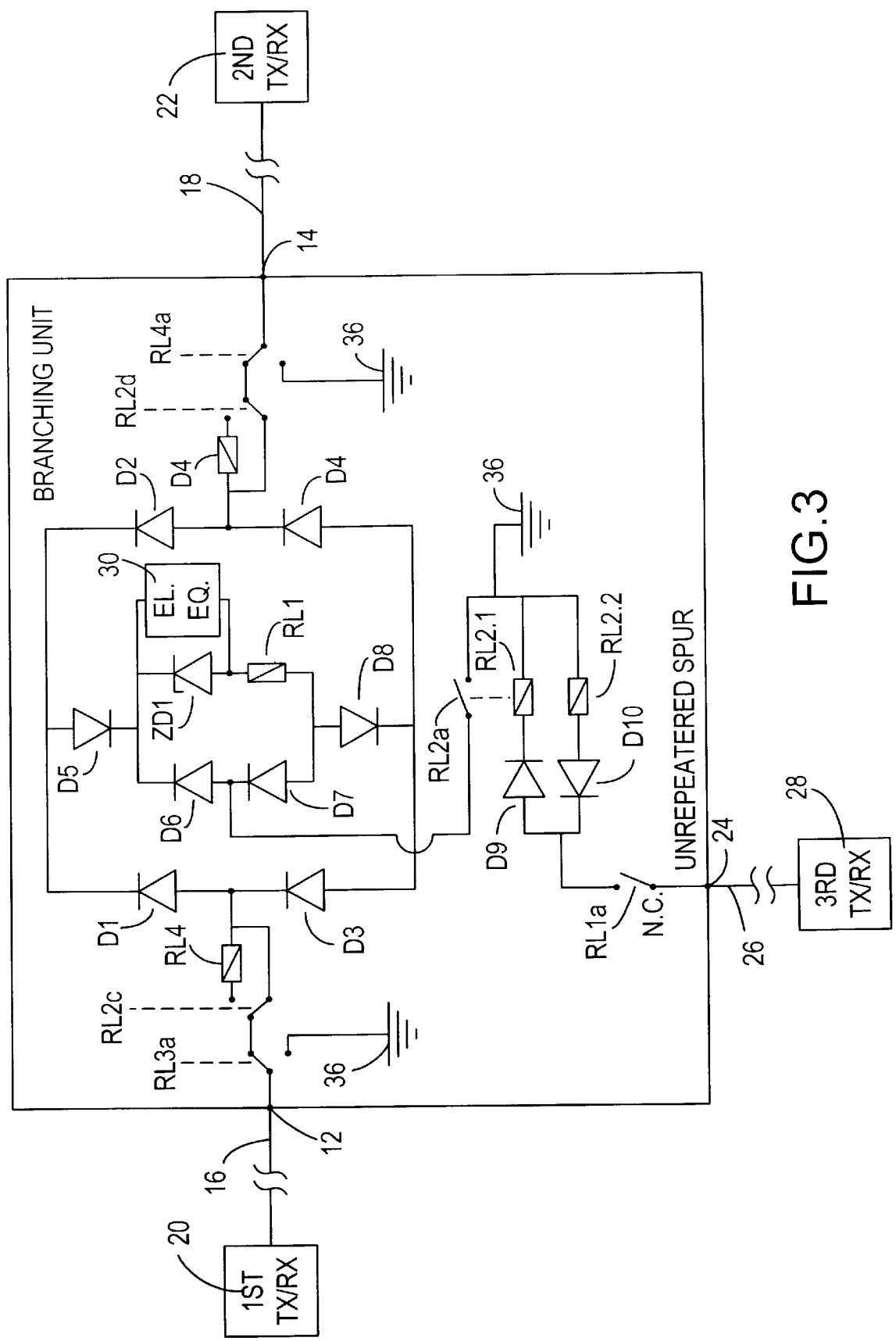
FIG. 3 shows a refinement of the invention including additional circuitry for providing an earth at the input to a branching unit.

Modification:

In order to improve the isolation of the 'switched out' trunk leg, the circuit shown in FIG. 3 can be used. This provides a sensing means for sensing the presence or absence of a current feed from one section of the trunk and for isolating the section from the unit and for providing a direct sea earth to the section. This adds two relays and requires a 3-way latching relay, but connected the 'switched-out' leg directly to sea earth. The modification has a pair of relays RL3, RL4 each having a pair of normally closed contacts and the relay RL2 has change over contacts RL2c, RL2d. Each connection 12, 14 of the unit is coupled via a change over contact RL3a, RL4a of a different one of the relays RL3, RL4 to an earth 36 or to a different one of the set of change over contacts RL2c, RL2d and each set of change over contacts RL2c, RL2d is arranged to connect, or bypass, the coil of a particular one of the pair of relays RL4, RL3 into the current path through the unit, thereby to apply the earth directly to a trunk section 18, 16 when there is a failure or break whilst there is current on the other section 16, 18.

The systems so far described relate to the use of an unrepeatered spur. It has been established that this is feasible based on the following calculations. Assume that a voltage of ~25V is needed to switch RL2, at the BU, and that the coil resistance is ~80Ω. Therefore, current required is ~0.3 A. The length of an unrepeatered spur is ~120 km maximum, and the resistance of unrepeatered cable is ~1.5 Ωkm, and so the total cable resistance of such a spur would be 180Ω, say 200Ω to allow for connection resistances etc. Therefore, the voltage required on the cable at the terminal station is ~60 V, which is well within the 500 V specified for the unrepeatered cable. So, the terminal station needs to be able to supply less than 100 V, 0.3 A both positive and negative polarity, for short periods of time (long enough to overcome capacitative effects in cable). The equipment required for this is simple and cost-effective.

Figure 4:
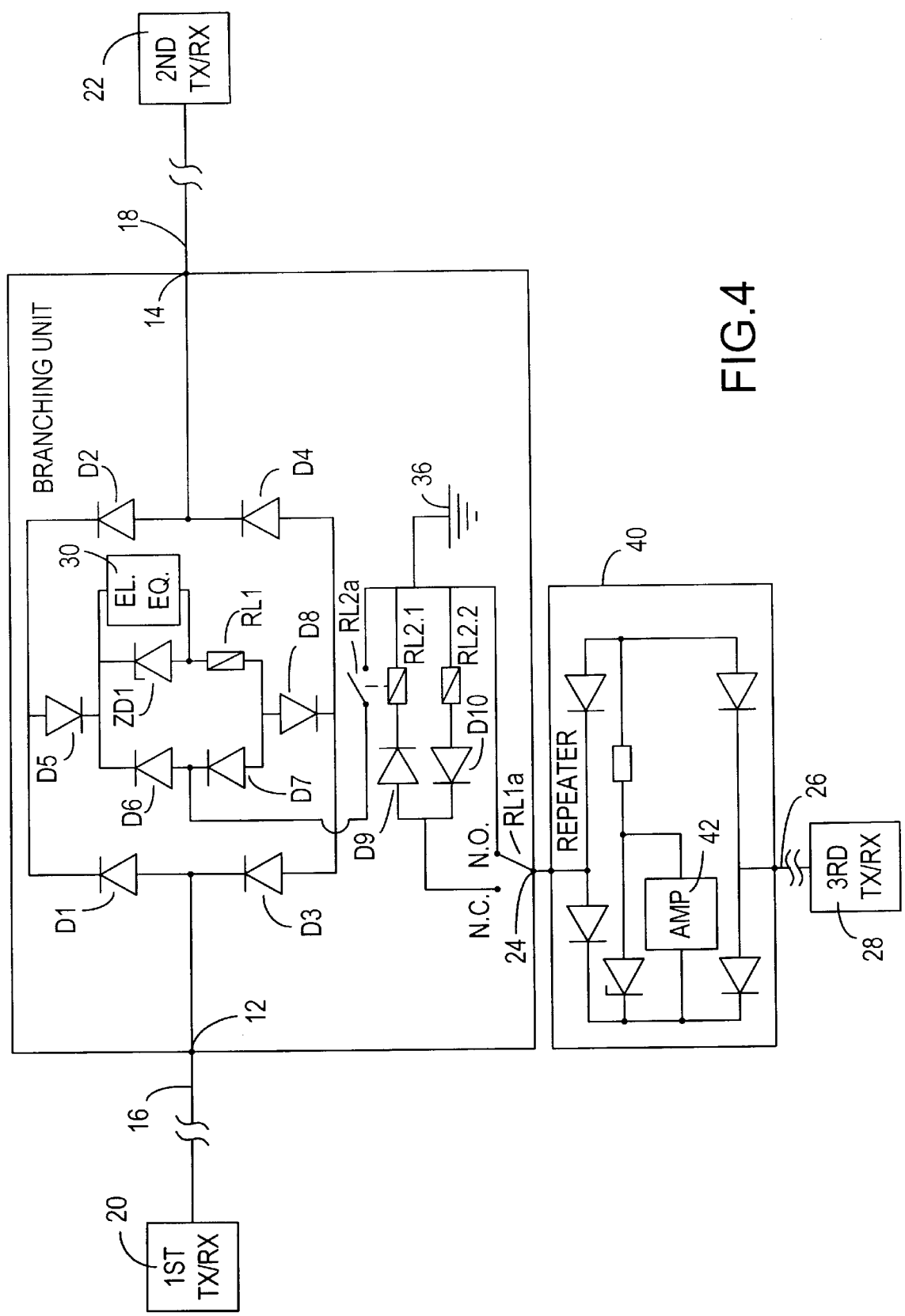
FIG. 4 shows a refinement of the invention including additional circuitry for maintaining power in the spur whether or not power is provided on the trunk.

It is also possible to employ the invention in a repeatered spur arrangement and to maintain a current supply to the amplifiers and supervisory circuit of the spur supply on the trunk. Such an arrangement is shown in FIG. 4 which is a modification of the circuit of FIG. 1. In this arrangement a repeater 40 has an amplifier/supervisory circuit 42 which is fed by current from the third transmit/receive station 28 via a diode network and a resistor and Zener diode voltage regulator similar to the arrangement shown in FIG. 1 for the branching unit. Here the relay contacts RL1a effect change over such that the spur terminal powers directly to earth 36 when the relay RL1 is operated. This arrangement allow the spur terminal to power directly to the sea earth whenever either leg of the trunk route is powered. If power is removed from the trunk RL1 will switch, enabling the spur to control the latching relay (RL2) via a positive or negative control voltage as before. Again, the switching cannot be carried out when either trunk leg is powered, ensuring that actions by the spur terminal cannot interrupt traffic on the trunk.

Amplifier(s) for the spur, if required, could be powered from the spur power feed, as indicated in FIG. 4. However, it may be desirable, from the point of view of system security, to supply spur amplification in the BU from the trunk power feed, in which case this part of the circuit would not be required.

Figure 5:
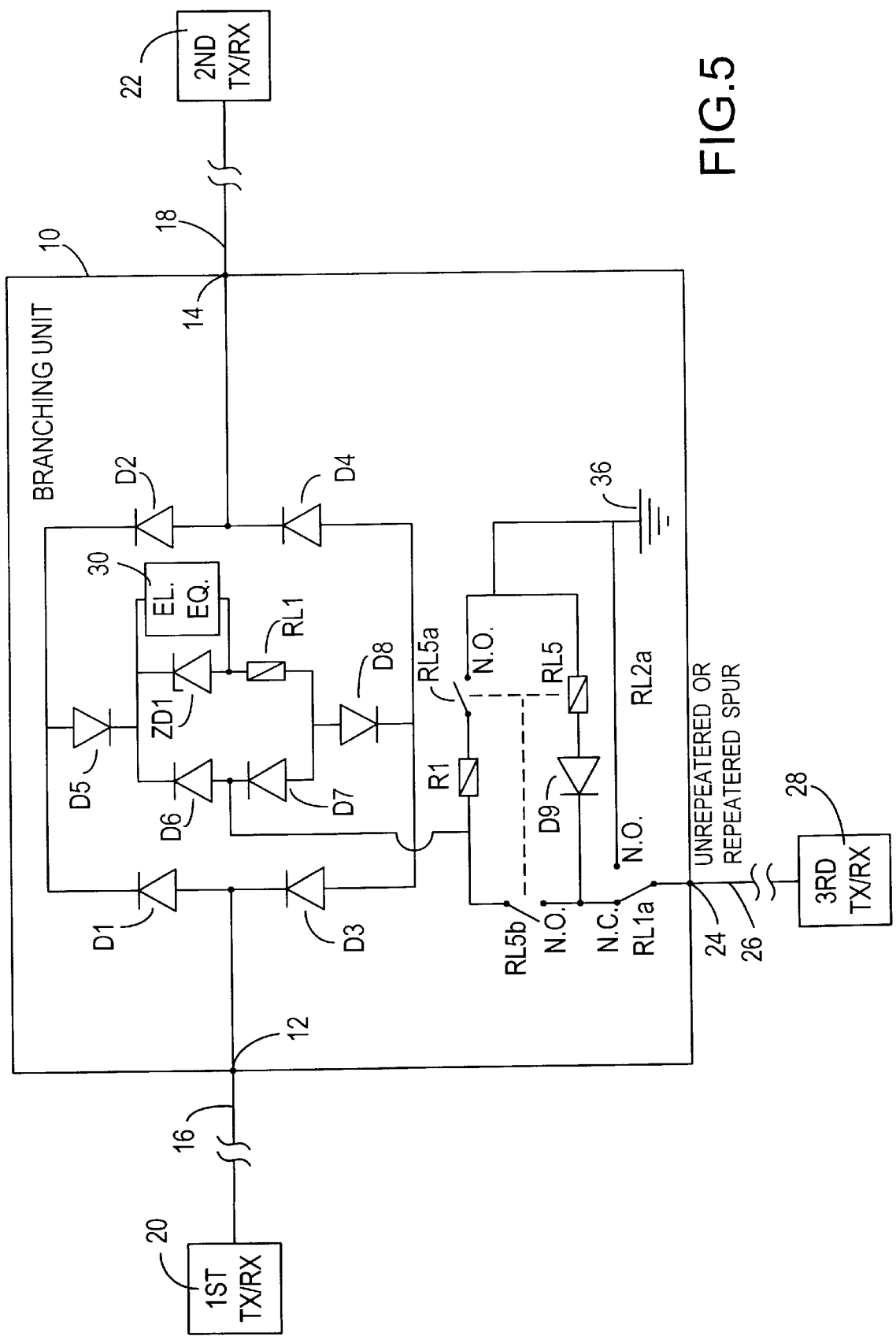
FIG. 5 is a switching circuit employing a non latching relay suitable for implementation in a branching unit in accordance with the invention.

The system described in connection with FIGS. 1 to 4 employ a latching relay. In some circumstances it may be more suitable to use a non latching relay. FIG. 5 shows an alternative arrangement employing such a relay having a relay coil RL5 and two pairs of normally open contacts RL5a and RL5b. In this arrangement the third connection 24 to the branching unit 10 is coupled via the normally closed contacts RL1a and normally open contacts RL5b to the junction between the sixth and seventh diodes D6, D& and via a series arrangement of a resistor R1 and normally open contacts RL5a to the earth 36. A node between contacts RL1a and RL5b is connected to the cathode of a ninth diode D9 the anode of which is coupled via relay coil RL5 to the earth 36. In this arrangement the application of a negative voltage to connection 24 from the spur transmit/receive terminal 28 energises the relay coil RL5 and causes contacts RL5a and RL5b to close. A standard double pole (non-latching) relay could be used to deploy the earth at the BU. In this case, a proportion of the line current from the trunk flowing to earth is used to hold the relay coil RL5 be employed for both unrepeatered and repeatered spurs, using the circuits previously described.

The state of the BU is now determined by the power-up sequence. If the spur is powered before the trunk (or a negative DC control voltage is applied by the spur if it is unrepeatered), the earth is applied. If the trunk is powered first, then no earth is applied at the BU because RL1a is opened.

There are two main advantages to this arrangement:

The BU has no 'memory', and no spur intervention is required to remove the earth once it has been applied.

The use of a latching relay is avoided, and a standard double pole relay is used instead.

In all of the circuit arrangements described the relays employed are preferably vacuum relays.

Conclusion:

A method of controlling power feed switching within a branching unit linking a powered trunk route to a spur (repeatered or unrepeatered) has been outlined. The circuit described utilises a control D.C. voltage through the spur cable, to cause the branching unit to change its powering configuration. The arrangement ensure that this can only occur when there is no line current on the main trunk cable. The method is particularly suitable for submerged systems where a sea earth may be switched in. However, a similar arrangement employing a real earth is possible and may be employed in systems on land. The circuits enable overall control of the power on the trunk from extreme trunk transmit/receive stations and although subsequent switching to correct fault conditions is possible from the spur station, now power is supplied to the trunk from the spurs so that the spur cannot operate the system in the absence of the provisions of power on the trunk.

What is claimed is:

1. A branching unit for an optical fibre cable system of the type which has an electrical power conductor for feeding current to electrical equipment provided along a main cable trunk, the unit having first and second connections (12, 14) for coupling two sections (16, 18) of trunk cable and a third connection (24) for an optical fibre spur cable (26), switching means (RL2) which is responsive to a control voltage provided on the conductor of the spur cable (26) to apply an earth (36) to the conductor of the trunk cable section (16), thereby to maintain a current path from trunk section (16) to the branching unit when a failure or break occurs in the other trunk section, characterised in that the switching means (RL2) is responsive to the control voltage only when there is a current path failure in one section of the trunk.

2. A branching unit as claimed in claim 1 for underwater use, characterised in that the switching means (RL2) is arranged to apply a sea earth (36) to the conductor of the trunk cable sections (16,18).

3. A branching unit as claimed in claim 2, characterised in that the switching means comprises a latching relay (RL2) which is triggered by the control voltage to the latched condition to apply the earth (36).

4. A branching unit for an optical fibre cable system of the type which has an electrical power conductor for feeding current to electrical equipment provided along a main cable trunk, the unit having first and second connections (12, 14) for coupling two sections (16, 18) of trunk cable and a third connection (24) for an optical fibre spur cable (26), switching means (RL2) which is responsive to a control voltage provided on the conductor of the spur cable (26) to apply an earth (36) to the conductor of the trunk cable sections (16, 18) thereby to maintain a current path from one trunk section to the branching unit when a failure or break occurs in the other trunk section, characterized in that the switching means (RL2) is responsive to the control voltage only when there is a current path failure in one section of the trunk, wherein the latching relay comprise a latch (RL2.2) and a release (RL2.1) coil each connected in series with an individual diode (D10, D9) such that a control voltage of one polarity is effective to actuate the latch to apply the sea earth (36) and that a control voltage of the opposite polarity is effective to release the latch to disconnect the earth (36).

5. A branching unit for an optical fibre cable system of the type which has an electrical power conductor for feeding current to electrical equipment provided along a main cable trunk, the unit having first and second connections (12, 14) for coupling two sections (16, 18) of trunk cable and a third connection (24) for an optical fibre spur cable (26), switching means (RL2) which is responsive to a control voltage provided on the conductor of the spur cable (26) to apply an earth (36) to the conductor of the trunk cable sections (16, 18) thereby to maintain a current path from one trunk section to the branching unit when a failure or break occurs in the other trunk section, characterized in that the switching means (RL2) is responsive to the control voltage only when there is a current path failure in one section of the trunk, wherein the switching means comprises a double pole relay (RL5), one pole (RL5a) of which is arranged upon actuation of the relay to apply the earth (36) in response to the control voltage and the other pole (RL5b) of which is arranged to close a current path from the trunk to the relay coil to maintain the relay in an actuated state, so long as power is available from the trunk, when the control voltage is removed.

6. A branching unit as claimed in claim 5, characterised in that the relay coil (RL5) is connected in series with a diode (D0) such that the relay is energised by a control voltage of only a predetermined polarity.

7. A branching unit for an optical fibre cable system of the type which has an electrical power conductor for feeding current to electrical equipment provided along a main cable trunk, the unit having first and second connections (12, 14) for coupling two sections (16, 18) of trunk cable and a third connection (24) for an optical fibre spur cable (26), switching means (RL2) which is responsive to a control voltage provided on the conductor of the spur cable (26) to apply an earth (36) to the conductor of the trunk cable sections (16, 18) thereby to maintain a current path from one trunk section to the branching unit when a failure or break occurs in the other trunk section, characterized in that the switching means (RL2) is responsive to the control voltage only when there is a current path failure in one section of the trunk, wherein disabling means (RL1) is provided for preventing actuation of the switching means (RL2, RL5) when power is present on either trunk section (16, 18).

8. A branching unit as claimed in claim 7, characterised in that the disabling means comprises an additional relay (RL1) which is responsive to current received from either trunk section (16,18), which relay has a pole (RL1a) which is arranged to isolate the control voltage from the switching means.

9. A branching unit as claimed in claim 8, characterised in that a current routing circuit (D1–D8, ZD1, RL1) is provided which ensures that a voltage supply with a predetermined polarity orientation is provided, for use by equipment (30) in the branching unit, irrespective of the polarity on the trunk.

10. A branching unit as claimed in claim 9, characterised in that a current routing circuit comprises a parallel network having first and second arms, each arm having a pair of diodes (D1, D2, & D3, D4) connected in series opposition between the first and second connections (12, 14) for the trunk sections, a fifth diode (D5) having its anode connected to the junction between the diodes (d1, D2) in the first arm and its cathode connected to the cathode of a sixth diode (D6) the anode of which is connected to the cathode of a seventh diode (D7), the anode of which seventh diode is connected to the anode of an eighth diode (D8) whose cathode is connected to the junction between the diodes (D3, D4) in the second arm, and a series arrangement of a Zener diode (ZD1) and a resistor (RL1) is connected between the cathode of the fifth diode (D5) and the anode of the eight diode (D8) such that the Zener diode is reverse biased and provides the voltage supply for use by equipment (30) in the branching unit.

11. A branching unit as claimed in claim 10, characterised in that the junction between the sixth and seventh diodes (D6, D7) is coupled via the switching means (RL2, RL5) to earth.

12. A branching unit for an optical fibre cable system of the type which has an electrical power conductor for feeding current to electrical equipment provided along a main cable trunk, the unit having first and second connections (12, 14) for coupling two sections (16, 18) of trunk cable and a third connection (24) for an optical fibre spur cable (26), switching means (RL2) which is responsive to a control voltage provided on the conductor of the spur cable (26) to apply an earth (36) to the conductor of the trunk cable sections (16, 18) thereby to maintain a current path from one trunk section to the branching unit when a failure or break occurs in the other trunk section, characterized in that the switching means (RL2) is responsive to the control voltage only when there is a current path failure in one section of the trunk, wherein sensing means (RL3, RL4) is provided coupled with the first and second connections (12, 14) of the unit for sensing the absence of a current feed from one of the trunk sections (16, 18) and for isolating the section from the unit and for providing a direct sea earth (36) to the section.

13. A branching unit as claimed in claim 12, characterised in that the sensing means comprises a pair of relays (RL3, RL4) each having a pair of normally closed contacts, the switching means has first and second switches (RL2c, RL2d) wherein each connection of the unit is coupled via a change over contact (RL3a, RL4a) of a different one of the relays to a sea earth (36) or to a different one of the switches (RL2C, RL2A) and each switch is arranged to connect or bypass the coil (RL4, RL3) of the other relay into the current path through the unit, thereby to apply the direct sea earth (36) to a trunk section (14, 16) where there is a failure or break when there is current on the other section.

14. An optical fibre communication system comprising a main trunk cable (16, 18) having an electrical power conductor for feeding current to electrical equipment (30) along the trunk cable, which trunk cable extends between remote transmission/receive station (20/22), at least one branching unit (10) for coupling sections (16, 18) of the trunk cable and for connecting an optical fibre spur cable (26), having an electrical power conductor, from the trunk to another transmission/receive station (28), switching means (RL2) which is responsive to a control voltage provided on the conductor of the spur cable (26) to apply an earth (36) to the conductor of the trunk cable section (16) thereby to maintain a current path from trunk section (16) to the branching unit when a failure or break occurs in the other trunk section characterised in the switch means (RL2) is responsive to the control voltage only when there is a current path failure in one section of the trunk.

15. An method of operating an optical fibre communication system of the type having an optical fibre cable trunk extending between remote transmit/receive stations and at least one branching unit for coupling sections of the trunk and for coupling an optical fibre spur cable from the trunk to another transmit/receive station, the cable having an electrical conductor for supplying electrical power from the remote transmit/receive stations to electrical equipment along the trunk cable, characterised in that the presence of a supply of current to the branching unit is monitored and that only in the absence of a supply, indicative of a fault or break in the trunk cable, a sea earth is automatically applied to the conductor at the branching unit to restore current supply from the trunk end to the side of the branching unit where no fault or break is present.

* * * * *

UNITED STATES PATENT AND TRADEMARK OFFICE
CERTIFICATE OF CORRECTION

PATENT NO : 6,166,836
DATED: : December 26, 2000
INVENTOR(S) : Crameri et al.
TITLE : POWER SWITCHING OF OPTICAL FIBRE CABLE BRANCHING UNITS It is certified that error appears in the above-identified patent and that said Letters Patent are hereby corrected as shown below:

column 7, line 12, claim 4, line 15, "comprise" should be --comprises--.

column 8, line 5, claim 10, line 2, "a" should be --the--.

column 8, line 61, claim 14, line 5 "(20/22)" should be --(20,22)--.

column 9, line 7, claim 15, line 1, "An" should be --A--.

Signed and Sealed this

Twenty-ninth Day of May, 2001

Attest:

NICHOLAS P. GODICI

Attesting Officer

Acting Director of the United States Patent and Trademark Office